United States Patent [19]

Maruta

[11] 4,107,470
[45] Aug. 15, 1978

[54] DIGITAL SSB-FDM COMMUNICATION SYSTEM DERIVED FROM A COMPLEX BAND-PASS DIGITAL FILTER BANK AND BY A FILTER BREAKDOWN PROCESS

[75] Inventor: Rikio Maruta, Tokyo, Japan

[73] Assignee: Nippon Electric Co., Ltd., Tokyo, Japan

[21] Appl. No.: 770,426

[22] Filed: Feb. 22, 1977

[30] Foreign Application Priority Data

Feb. 24, 1976 [JP] Japan ................................. 51-19328
May 12, 1976 [JP] Japan ................................. 51-54179

[51] Int. Cl.² ............................................. H04J 1/18
[52] U.S. Cl. ................................ 179/15 FS; 364/726
[58] Field of Search ...................... 179/15 FD, 15 FS; 325/50, 42, 137, 330; 332/45; 235/152; 364/724, 726

[56] References Cited

U.S. PATENT DOCUMENTS

| | | | |
|---|---|---|---|
| 3,605,019 | 9/1971 | Cutter | 179/15 FD |
| 3,891,803 | 6/1975 | Daguet | 179/15 FS |
| 3,971,922 | 7/1976 | Bellanger | 179/15 FS |

Primary Examiner—Kathleen H. Claffy
Assistant Examiner—Joseph A. Popek
Attorney, Agent, or Firm—Ostrolenk, Faber, Gerb & Soffen

[57] ABSTRACT

An SSB-FDM modulator derived from a complex band-pass digital filter bank and by a filter breakdown process comprises a discrete Fourier transform (DFT) processor capable of giving phase offsets to complex output signals thereof. In a broader sense, DFT includes inverse DFT (IDFT). The processor is called an offset discrete Fourier transform (ODFT) processor and supplied with real baseband sample sequences. The phase offset complex output signals are frequency-selected by a complex band-pass digital filter unit operable at a sampling frequency for the baseband sample sequences into a real SSB-FDM signal. An SSB-FDM demodulator likewise derived comprises a complex band-pass digital filter unit for frequency-selecting a real SSB-FDM signal into complex sample sequences of the respective baseband channels. The complex sample sequences are ODFT'ed into real baseband sample sequences. For simplified processing of signals transmitted between the modulator and demodulator, use is made of at least one dummy baseband channel. The phase offsets may be provided in the modulator by a post-processor following a conventional DFT processor and in the demodulator by a pre-processor prior to conventional DFT. If desired, frequency spectra of the sample sequences of predetermined one or ones of the baseband channels may be reversed in the modulator prior to digital filtering and in the demodulator after the ODFT.

10 Claims, 18 Drawing Figures

DIGITAL SSB-FDM COMMUNICATION SYSTEM DERIVED FROM A COMPLEX BAND-PASS DIGITAL FILTER BANK AND BY A FILTER BREAKDOWN PROCESS

BACKGROUND OF THE INVENTION

This invention relates to a single side-band frequency division multiplexed (SSB-FDM) communication system for carrying out conversion between a plurality of baseband channel signals, each having a predetermined bandwidth, and an SSB-FDM signal.

In a sophisticated communication system of the type specified, the conversion is carried out by the use of an analog modulator, demodulator, and band-pass filters. Recent developments in integrated circuit techniques and digital signal processing have enabled digital conversion to be resorted to. The digital conversion renders the system compact and economical, facilitates manufacture and ease of maintenance of the systems, and raises the performance and the uniformity of operation characteristics. Besides the enumerated merits, digital conversion makes it readily possible to carry out connection between a time division multiplexed (TDM) digital communication network and an FDM analog communication network. The compactness and the cost of manufacture of a system for performing digital conversion, however, are dependent on the frequency or rate of multiplication to be carried out in the system per unit time.

An example of the systems of the digital conversion type is disclosed in an article contributed by M. G. Bellanger and J. L. Daguet to "IEEE Transactions on Communications," Vol. COM-22, No. 9 (September 1974), pp. 1199–1205, under the title of "TDM-FDM Transmultiplexer; Digital Polyphase and FET," particularly with reference to FIG. 8 of the article. In the disclosed system, input sample sequences are converted to sequences of complex samples. The complex samples are supplied to an inverse discrete Fourier transform (IDFT) processor having N pairs of input terminals for the complex samples and 2N output terminals for real signals. The real signals are supplied to 2N real filters, whose output signals are converted into an output SSB-FDM signal by a delay circuit. Inasmuch as the input sample sequences are converted to complex signals before the IDFT processing, the disclosed system has to carry out multiplication at a considerable rate, giving rise to an accumulation of errors, and is bulky, and has a slow speed of operation.

SUMMARY OF THE INVENTION

It is therefore an object of the present invention to provide a digital SSB-FDM communication system wherein use of complex signals is avoided as far as possible.

It is another object of this invention to provide a system of the type described, wherein reduction is achieved in the frequency of multiplication carried out per unit time.

It is still another object of this invention to provide a system of the type described, wherein the number of steps of calculation is reduced to a minimum.

It is yet another object of this invention to provide a system of the type described, which is compact, reliable, operable at a high speed, inexpensive, and readily manufactured and adapted to facilitate maintenance.

An SSB-FDM communication system according to this invention is derived from a fundamental complex band-pass digital filter bank concept later described with reference to several figures of the accompanying drawing and by a filter breakdown process which is described in the above-referenced Bellanger et al article and adapted to complex band-pass digital filters of the bank as will be clarified hereunder with reference to several figures of the accompanying drawing.

In accordance with this invention, there is provided an SSB-FDM communication system for input sample sequences of real samples derived with a first sampling frequency $f_s$ from baseband signals, respectively, of a plurality of baseband channels, N in number. The baseband channels include a predetermined number of dummy baseband channels, where the predetermined number is less than N. Each of the baseband signals has a bandwidth equal at most to $f_s/2$. The communication system comprises first means for subjecting the sample sequences to offset discrete Fourier transform to convert the sample sequences into complex sample sequences, N in number, second means for digitally band-pass filtering the complex sample sequences into a real SSB-FDM sequence of samples corresponding to the real samples and sampled at a second sampling frequency equal to $Nf_s$, third means for converting the SSB-FDM sequence into a plurality of constituent sample sequences, N in number, fourth means for digitally band-pass filtering the constituent sample sequences into complex sample sequences, N in number, the complex samples corresponding to the samples of the SSB-FDM sequence and sampled at the first sampling frequency, and fifth means for subjecting the last-mentioned sample sequence of the complex samples to offset discrete Fourier transform to convert the last-mentioned sample sequences of the complex samples into reproductions of the input sample sequences.

DESCRIPTION OF THE PREFERRED EMBODIMENTS

It is to be understood at first that a sequence of samples, as used in the following description, means a sequence of digital code words. This does not restrict the generality of the present invention because it is readily possible to convert the digital code word sequence into a sequence of analog samples, namely, a pulse amplitude modulated (PAM) signal, by a digital-to-analog converter and further into a continuous analog signal by causing the analog sample sequence to pass through a filter of pertinent characteristics. Furthermore, it is possible to convert a continuous analog signal into a sequence of digital samples by sampling the former into a PAM signal and thereafter subjecting the PAM signal to analog-to-digital conversion. Also, the word "slow" refers in the following to a slow sampling rate of a first sampling frequency $f_s$, while the word "fast" relates to a fast sampling rate of a second sampling frequency $Nf_s$, where N represents the number of separate channels multiplexed into a multiplexed signal. The frequencies are in hertz. The separate channels are numbered from 0 to N−1. The channel numbers are generally identified by a symbol $k$. For simplicity of description, a slow sampling period, namely, an inverse quantity of the first sampling frequency $f_s$, will be represented by T. On the other hand, let Z represent an operator for advancing a sample sequence by one fast sampling period of the second sampling frequency $Nf_s$. The operator Z is defined by:

$$Z = \exp(j2\pi f/[Nf_s]) = \exp(j2\pi fT/N),$$

where $f$ represents frequencies of the input signal components contained in the sample sequence. Incidentally, $n$ represents indices of sampling instants.

Figure 1:
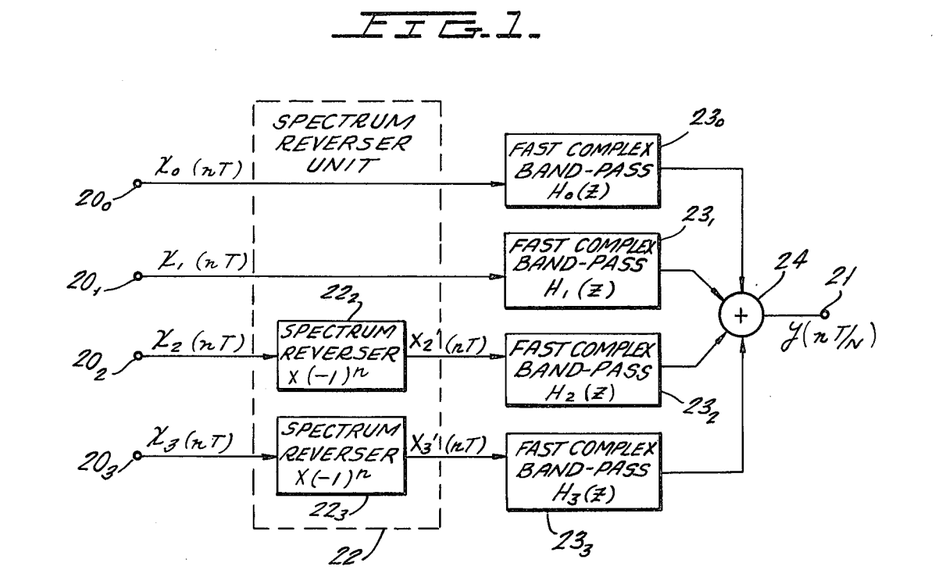
FIG. 1 is a block diagram of a first complex band-pass filter bank.
Figure 2:
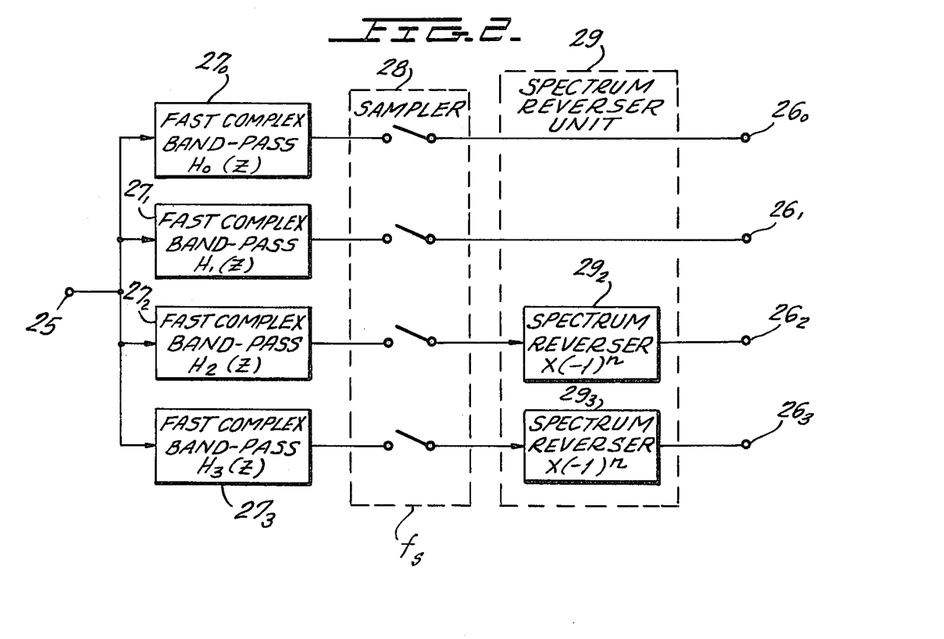
FIG. 2 is a block diagram of a second complex band-pass filter bank.
Figure 3:
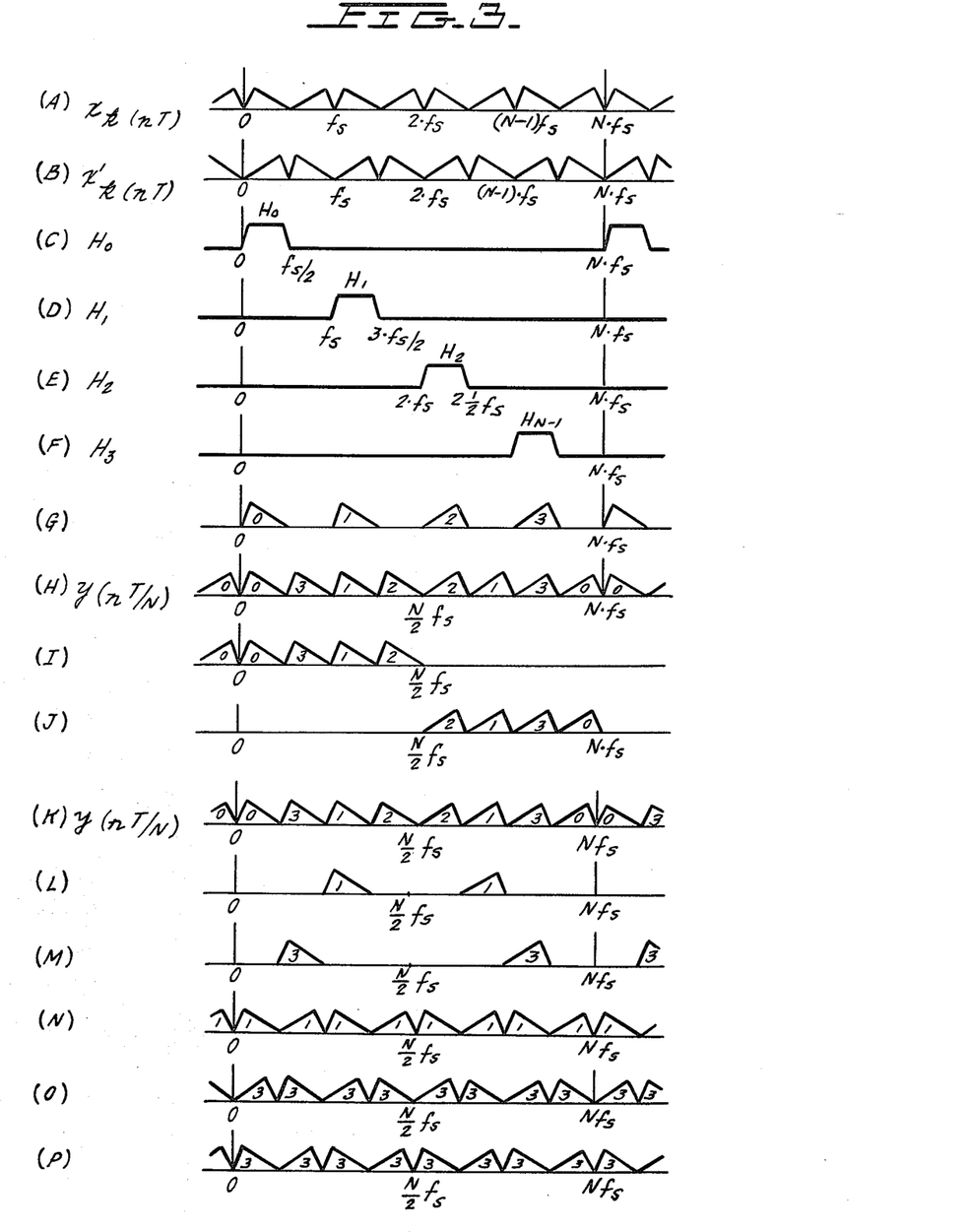
FIG. 3 shows frequency spectra of several signals appearing in the first and second filter banks.

Referring to FIGS. 1 and 3 with reference to FIG. 2 deferred for a short while, a first complex band-pass digital filter bank will be described for a better understanding of this invention. The filter bank comprises a plurality of input terminals $20k$, namely, $20_0$, $20_1$, $20_2$, ..., and $20_{N-1}$, N being four in the example being illustrated, for input baseband sample sequences $x_k(nT)$ of $k$-th or zeroth through (N−1)-th baseband channels. The first sampling frequency $f_s$ is naturally selected so that each of the baseband channel signals has a bandwidth equal to or narrower than $f_s/2$. As exemplified in FIG. 3 at (A), each of the sample sequences has a frequency spectrum of a period of the first sampling frequency $f_s$. The filter bank further comprises an output terminal 21 for an output sample sequence $y(nT/N)$, to be presently described, and a spectrum reverser unit 22 comprising, in turn, spectrum reversers $22_2$ and $22_3$, described later, for converting the input baseband sample sequences of a predetermined one or ones of the channels, such as the N/2-th through (N−1)-th baseband channels, into spectrum-reversed sample sequences $x_k'(nT)$, each having a reversed frequency spectrum shown in FIG. 3 at (B), by multiplying the samples of each predetermined channel successively by factors $(-1)^n$. The filter bank still further comprises a plurality of fast complex band-pass digital filters $23k$, described later, for producing complex filter output signals in response to the spectrum-reversed and untouched sample sequences, and a conventional adder 24 for summing up the filter output signals. Let the fast complex band-pass filters $23k$ have transfer functions $H_k(Z)$ having passbands between $kf_s$ and $kf_s + f_s/2$ as shown in FIG. 3 at (C), (D), (E), and (F). Comparison of the frequency spectra depicted at (A) through (F) will readily reveal that the filter output signals, when merely summed up, result in a sum signal which has a frequency spectrum depicted in FIG. 3 at (G). That real part of the sum signal which is derived when the adder 24 is connected to the fast complex band-pass filters $23k$ so as to sum up only real parts of the filter output signals, has a frequency spectrum shown in FIG. 3 at (H) and is the output sample sequence of samples sampled at the second sampling frequency $Nf_s$ from an SSB-FDM signal having a bandwidth between 0 and $Nf_s/2$ into which the baseband channel signals are SSB-FDM'ed. The output sample sequence, when subjected to digital to analog conversion and to pass through an analog low-pass filter or an analog band-pass filter having a passband between $Nf_s/2$ and $Nf_s$ (not shown), has frequency spectra illustrated in FIG. 3 at (I) and (J), respectively.

From the frequency spectra depicted in FIG. 3 at (G) through (J), it is seen that the samples of the respective baseband channel signals are not arranged in the SSB-FDM signal in the order of the channel numbers $k$. This, however, is not inconvenient in practice. If desired, the transfer functions of the fast complex band-pass filters $23k$ may be interchanged so as to arrange the samples in the order of the channel numbers $k$. The spectrum reverser unit 22 is dispensed with when it is unnecessary for the samples depicted at (I) or (J) to have one and the same frequency dependency. It will also be seen that the number N of channels need not be an even number. On the other hand, it is to be pointed out here that the baseband channels should include at least one dummy baseband channel, such as that numbered 2 for the frequency spectrum depicted at (I) or those numbered 0 and 2 for the spectrum in (J), so as to enable the above-mentioned analog low-pass or band-pass filter to avoid having a sufficiently sharp cutoff characteristic.

Referring now to FIGS. 2 and 3, a second complex band-pass digital filter bank comprises an input terminal 25 for an input SSB-FDM sample sequence $y(nT/N)$ produced in the manner described hereinabove and depicted in FIG. 3 again at (K), and a plurality of output terminals $26k$ for output baseband sample sequences which are reproductions of the sample sequences $x_k(nT)$ of the respective baseband channels for the first filter bank. The second filter bank further comprises a plurality of fast complex band-pass digital filters $27k$, similar to the filters $23k$ of the first filter bank, for producing those complex filter output signals in response to the input SSB-FDM sample sequence, of which real parts are discrete samples of the respective baseband channel signals as exemplified in FIG. 3 at (L) and (M), a sampler 28 symbolized by switches operable at the first sampling frequency $f_s$ for sampling the discrete samples into successive samples shown in FIG. 3 at (N) and (O), and a spectrum reverser unit 29 comprising, in turn, spectrum reversers $29_2$ and $29_3$ for reversing the frequency spectra of the successive samples of the above-mentioned predetermined channels back into frequency spectra of the baseband channel signal samples exemplified in FIG. 3 at (P).

Figure 4:
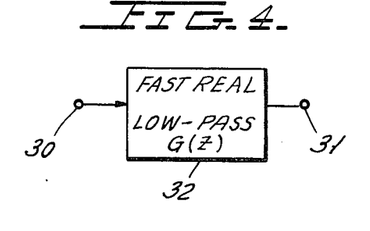
FIG. 4 is a block diagram of a fast real low-pass filter.
Figure 5:
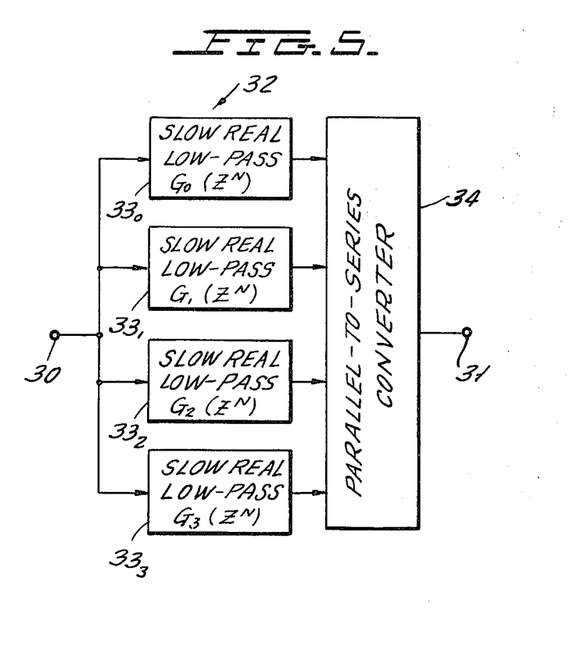
FIG. 5 is a block diagram of a fast real low-pass filter comprising a plurality of slow real low-pass filters.
Figure 6:
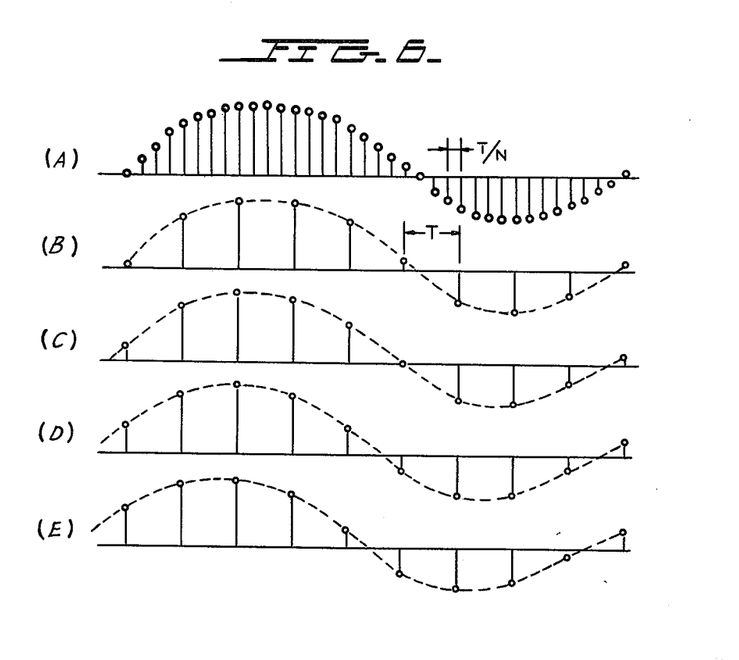
FIG. 6 shows impulse responses of the filter illustrated in FIG. 4 and the filters depicted in FIG. 5.

Referring to FIGS. 4 and 6 with reference to FIG. 5 postponed for the time being, a fast real low-pass filter of a transfer function G(Z) and of a bandwidth $f_s/4$ will be described in order to derive the above-mentioned fast complex band-pass filters 23k and 27k of the transfer functions $H_k(Z)$ and of a common bandwidth $f_s/2$. According to the filter breakdown process described in the above-cited Bellanger et al article and to those frequency shifts of $(4k + 1)f_s/4$ which are the center frequencies of passbands of the respective band-pass filters 23k and 27k, $$H_k(Z) = G(exp[j2\pi(f - [4k + 1]f_s/4)T/N]) = G(Zexp[-j2\pi(4k + 1)/(4N)]). \quad (1)$$

The low-pass filter comprises an input terminal 30 for an input signal sampled by the use of the first sampling frequency $f_s$, an output terminal 31 for an output signal sampled with the second sampling frequency $Nf_s$, and a digital filter 32 having the transfer function G(Z). Let an impulse response, namely, the output signal produced at the output terminal 31 when an impulse is supplied to the input terminal 30 as the input signal, be as depicted in FIG. 6 at (A). It is to be pointed out here that a filter is mathematically completely equivalent to another when the two have one and same impulse response.

Referring now to FIGS. 5 and 6, a composite fast real low-pass filter comprises an input terminal 30 and an output terminal 31, both being equivalents of the corresponding terminals 30 and 31 described with reference to FIG. 4. The composite filter further comprises a plurality of slow real low-pass filters 33i, N in number, of transfer functions $G_i(Z^N)$, where $i$ represents input or output points specified by integers between 0 and N−1 as is the case with the channel numbers k. Let impulse responses of the filters 33i be composed of samples sampled at the first sampling frequency $f_s$ from impulse responses of $Z^iG(Z)$, namely, those which are identical in outline to the impulse response shown in FIG. 6 at (A) and have phases advanced by $i$ fast sampling period or periods $iT/N$, as depicted in FIG. 6 at (B), (C), (D), and (E). The composite filter still further comprises a parallel-to-series converter 34 for time division multiplexing output signals of the respective filters 33i by delaying the output signals by $i$ fast sampling period or periods. The time division multiplexed signal is supplied to the output terminal 31. The fast real low-pass filter described with reference to FIG. 4 is now equivalent to the composite fast real low-pass filter comprising the slow real low-pass filters 33i. It is clear that:

$$G(Z) = \sum_{i=0}^{N-1} Z^{-i} G_i(Z^N) \quad (2)$$

from the structure of the composite filter. By substituting Equation (2) into Equation (1), $$\begin{aligned} H_k(Z) &= \sum_{i=0}^{N-1} (Zexp[-j2\pi(4k + 1)/(4N)])^{-i} \\ &\times G_i(Z^N exp[(-j2\pi(4k + 1)N/(4N)]) \\ &= \sum_{i=0}^{N-1} Z^{-i} exp[j2\pi(4k + 1)i/(4N)] \cdot G_i(-jZ^N), \end{aligned} \quad (3)$$

where $G_i(-jZ^N)$ represents transfer functions derived for slow complex band-pass filters of center frequencies $f_s/4$, described later, by substituting $-jZ^N$ for $Z^N$ in the transfer functions $G_i(Z^N)$ of the slow real low-pass filters 33i.

It is now possible to derive several formulae representative of or equivalent to operation of the first filter bank described with reference to FIGS. 1 and 3. Inasmuch as a Z transform Y(Z) of the output SSB-FDM sample sequence is the real part of the sum signal, the Z transform is given by:

$$Y(Z) = Re\left[ \sum_{k=0}^{N-1} H_k(Z) X_k(Z^N) \right], \quad (4)$$

where $X_k(Z^N)$ represents Z transforms of the input baseband sample sequences supplied to the fast complex band-pass filters 23k with the frequency spectrum or spectra reversed as the case may be. Substitution of Equation (3) into Equation (4) gives:

$$y(Z) = Re\left[ \sum_{i=0}^{N-1} Z^{-i} G_i(-jZ^N) A_i(Z^N) \right], \quad (5)$$

where $A_i(Z^N)$ represents output-point complex sample sequence defined by:

$$A_i(Z^N) = \sum_{k=0}^{N-1} X_k(Z^N) exp(j2\pi[4k + 1]i/[4N]). \quad (6)$$

The operation in Equation (6) for the Z transforms $X_k(Z^N)$ will herein be called inverse offset discrete Fourier transform (IODFT) because of its similarity to IDFT (inverse discrete Fourier transform). More particularly, IODFT is equal to IDFT accompanying multiplication by phase offset factors $exp(j2\pi i/[4N])$ as will be discussed hereunder.

As for the second filter bank illustrated with reference to FIGS. 2 and 3, Z transforms $X_k(Z)$ of first real sample sequences supplied from the fast complex band-pass filter 27k to the sampler 28 are:

$$X_k(Z) = Re[Y(Z)H_k(Z)],$$

where Y(Z) represents a Z transform of an input SSB-FDM sample sequence supplied to the input terminal 25. Inasmuch as the transfer functions $H_k(Z)$ are given by Equation (3) and inasmuch as it is possible to decompose the input sample sequence into a plurality of constituent sample sequences $Y_q(Z^N)$, N in number, sampled from baseband channel signals, respectively, at sampling instants spaced by the slow sampling period T with successive delays $Z^{-q}$, namely, $q$ fast sampling period or periods, the Z transforms are given by:

$$X_k(Z) = Re[\sum_{q=0}^{N-1} Z^{-q}Y_q(Z^N)H_k(Z)]$$
$$= Re[\sum_{i=0}^{N-1} \exp(j2\pi[4k+1]i/[4N])G_i(-jZ^N)\sum_{p=i}^{N-1+i} Z^{-p}Y_{p-i}(Z^N)],$$

where $p = q + i$. When it is presumed that the sampler 28 samples the first real sample sequences simultaneously at a sampling instant specified by $p = N-1$, Z transforms $X_k(Z^N)$ of second real sample sequences produced by the sampler 28 are:

$$X_k(Z^N) = Re[\sum_{i=0}^{N-1} \exp(j2\pi[4k+1]i/[4N])G_i(-jZ^N)Y_{N-1-i}(Z^N)] \qquad (7)$$
$$= \sum_{i=0}^{N-1} ([B_i(Z^N) - jB_{N-i}^*(Z^N)]/2)\exp(j2\pi[4k+1]i/[4N]),$$

where $B_i(Z^N)$ is defined by:

$$B_i(Z^N) = G_i(-jZ^N)Y_{N-1-i}(Z^N),$$

herein called input-point complex sample sequences, and $B_i^*(Z^N)$ represents conjugate complex quantities of the input-point sample sequences. Operation in Equation (7) for the input-point complex sample sequences is again called IODFT.

It is now understood that the first and second filter banks are realized by circuits for carrying out calculation of Equations (5) and (7). More particularly, input baseband sample sequences, N in number, are obtained for conversion thereof to an output SSB-FDM sample sequence by sampling baseband channel signals at the first sampling frequency $f_s$. With the samples of predetermined ones of baseband channels multiplied by $(-1)^n$ if desired, the baseband sample sequences are subjected to IODFT for producing output-point complex sample sequences $A_i(Z^N)$ in accordance with Equation (6). The output-point complex sample sequences are multiplied by transfer functions $G_i(-jZ^N)$ and thereby turned into filter output signals. After being subjected to delays of predetermined integral multiples of one fast sampling period T/N, the filter output signals are summed up into the output SSB-FDM sample sequence. On the other hand, an input SSB-FDM sample sequence is decomposed into those constituent sample sequences, N in number, which are picked out of baseband sample sequences at sampling instants spaced by the slow sampling period with successive delays of predetermined integral multiples of one fast sampling period. The constituent sample sequences are multiplied by transfer functions $G_i(-jZ^N)$ for deriving input-point complex sample sequences $B_i(Z^N)$. The input-point complex sample sequences are now subjected to IODFT for producing the above-mentioned second real sample sequences according to Equation (7). The second real sample sequences, when those of the predetermined baseband channels are multiplied by $(-1)^n$, become reproductions of the baseband sample sequences. Incidentally, conversion between the baseband channel signals and the SSB-FDM sample sequence includes the sampling processes and consequently the amplitude modulation and demodulation processes.

Figure 7:
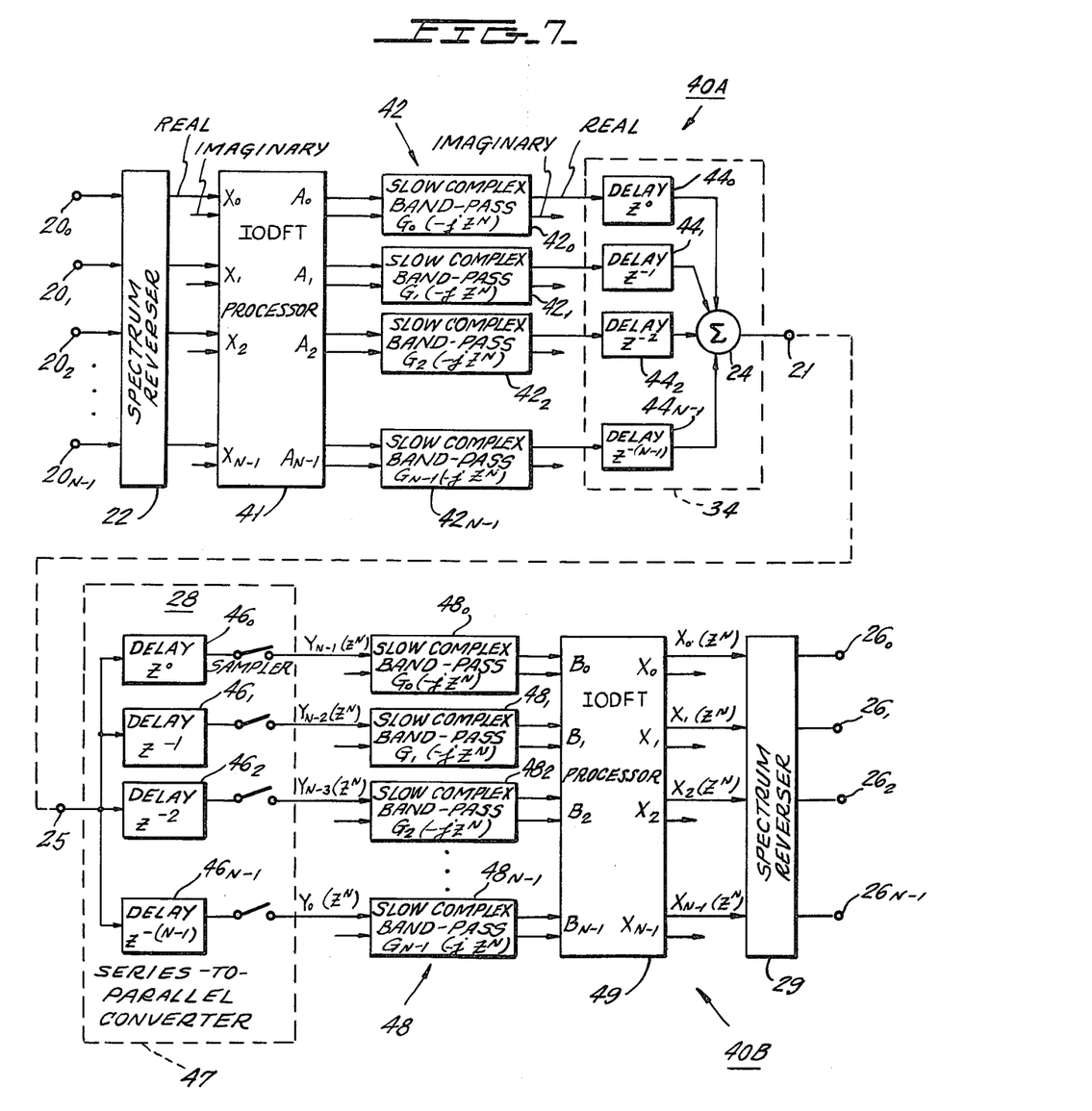
FIG. 7 is a block diagram of an SSB-FDM communication system according to a first embodiment of the present invention.

Turning now to FIG. 7, an SSB-FDM digital communication system according to a first embodiment of this invention comprises a modulator 40A and a demodulator 40B. The modulator 40A comprises, in turn, a plurality of input terminals 20k, an output terminal 21, a spectrum reverser unit 22 for producing the above-mentioned input baseband sample sequences $X_k(Z^N)$, and a parallel-to-series converter 34, all described with reference to FIGS. 1 and 5. The modulator 40A further comprises an IODFT processor 41, described shortly hereunder, having complex input terminals $X_k$ and complex output terminals $A_i$. Each complex terminal consists of a pair of terminals for the real and imaginary parts of a signal. Supplied with input baseband sample sequences at the real ones of the complex input terminals $X_k$, the IODFT processor 41 carries out IODFT of Equation (6) to produce output-point complex sample sequences $A_i(Z^N)$ at the complex output terminals $A_i$. The complex sample sequences are supplied to a slow complex band-pass filter unit 42 comprising a plurality of slow complex band-pass filters 42k having transfer functions $G_i(-jZ^N)$ for producing slow filter output signals which correspond to $G_i(-jZ^N)A_i(Z^N)$ in Equation (5). The real parts of the slow filter output signals are supplied to delay circuits 44k of the parallel-to-series converter 34 to be multiplied by $Z^{-i}$ (delayed by $i$ fast sampling period or periods iT/N), respectively. The delayed signals are summed up by the adder 24 and delivered to the output terminal 21 as an output SSB-FDM sample sequence. The adder 24 and the delay circuits 44k serves as the parallel-to-series converter 34.

Further referring to FIG. 7, the demodulator 40B comprises an input terminal 25, a plurality of output terminals 26k, a sampler 28, and a spectrum reverser unit 29, described with reference to FIG. 2. After being multiplied by $Z^{-i}$ at delay circuits 46k, an input SSB-FDM sample sequence is broken down by the sampler 28 into the respective constituent sample sequences $Y_{N-1-i}(Z^N)$. The delay circuits 46k and the sampler 28 serve as a series-to-parallel converter 47. The constituent sample sequences are supplied to a real input terminal member of a slow complex band-pass filter unit 48 having transfer functions $G_i(-jZ^N)$, namely, to real input terminals of slow complex band-pass filters 48k in the example being illustrated, and thereby turned into input-point complex sample sequences $B_i(Z^N)$, which are now supplied to complex input terminals $B_i$ of an IODFT processor 49 for carrying out IODFT of Equation (7). Real parts of the IODFT'ed signals produced at complex output terminals $X_k$ of the IODFT processor 49 are converted by the spectrum reverser unit 29 to reproductions of the baseband sample sequences.

In connection with the SSB-FDM communication system described with reference to FIG. 7, it should be noted here that a broken-line connection between the modulator 40A and demodulator 40B may include the above-mentioned digital-to-analog converter, analog filters, and analog-to-digital converter. Also, the IODFT processor 41 or 49 is realized by a combination of multipliers and adders for calculating Equation (6) or (7). When it is possible to give the number of baseband channels N by a product of prime numbers, the number of multipliers is drastically reduced by the use of the fast Fourier transform (FFT) algorithm with decimation in frequency or in time. The FFT algorithm is described in many publications, such as, for example, in Chapters 6 and 10 of a book "Theory and Application of Digital Signal Processing" written by L. R. Rabiner and B. Gold and published 1975 by Prentice-Hall, U.S.A. Inasmuch as the signals supplied to the IODFT processor 41 of the modulator 40A or derived from the IODFT processor 49 of the demodulator 40B are only real signals, it is possible to reduce the number of calculation elements of the processors 41 and 49 by one-half as compared with a processor of the type for complex input and output signals.

Figure 8:
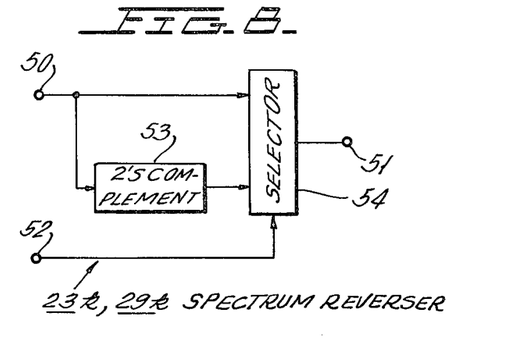
FIG. 8 is a block diagram of a spectrum reverser to be used, if desired, in an SSB-FDM communication system according to this invention.

Referring to FIG. 8, a spectrum reverser 22$k$ or 29$k$ has a sample sequence input terminal 50, an output terminal 51, and a timing signal input terminal 52. When the samples of each sequence are either given by two's complements or converted into two's complements before application thereof to the sample sequence input terminal 50, the spectrum reverser 22$k$ or 29$k$ comprises a two's-complement circuit 53, described hereunder, connected to the sample sequence input terminal 50 and a selector or switch 54 responsive to the timing signal for selectively supplying the untouched or bypassed samples and the two's complements of the samples to the output terminal 51. The timing signal is representative of even or odd frames of a sampling pulse sequence of the first sampling frequency $f_s$. When the samples of each sequence are given by signed magnitudes, a spectrum reverser 22$k$ or 29$k$ may be an inverter responsive to a timing signal for inverting the sign bits of the samples at every other sampling instant.

Figure 9:
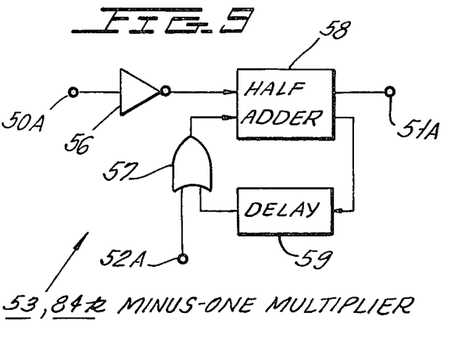
FIG. 9 is a block diagram of a minus-one multiplier used in the spectrum reverser.

Referring to FIG. 9, a two's-complement circuit 53 has a sample sequence input terminal 50A, an output terminal 51A, and a timing signal input terminal 52A. When the samples of each sequence are given by two's complement, the two's-complement circuit 53 is a minus-one multiplier which comprises an inverter 56 connected to the sample sequence input terminal 50A, an OR gate 57 connected to the timing signal input terminal 52A, a half adder having input terminals connected to the inverter 56 and the OR gate 57 and an output terminal connected to the circuit output terminal 51A, and a one-bit delay circuit 59 interposed between a carry output terminal of the half adder and the OR gate 57. With a logic "1" value, the timing signal specifies the least significant digit of each sample supplied to the input terminal 50A. When each sample is supplied to the input terminal 50A serially with the least significant digit supplied first, the inverter 56 supplies the half adder 58 with a one's complement of the sample, namely, the sample with all bits inverted. Only when the bit supplied to the input terminal 50A is the least significant digit of the sample, the half adder 58 is also supplied with a logic "1" signal through the OR gate 57 to produce a two's complement of the sample.

Figures 10, 11:
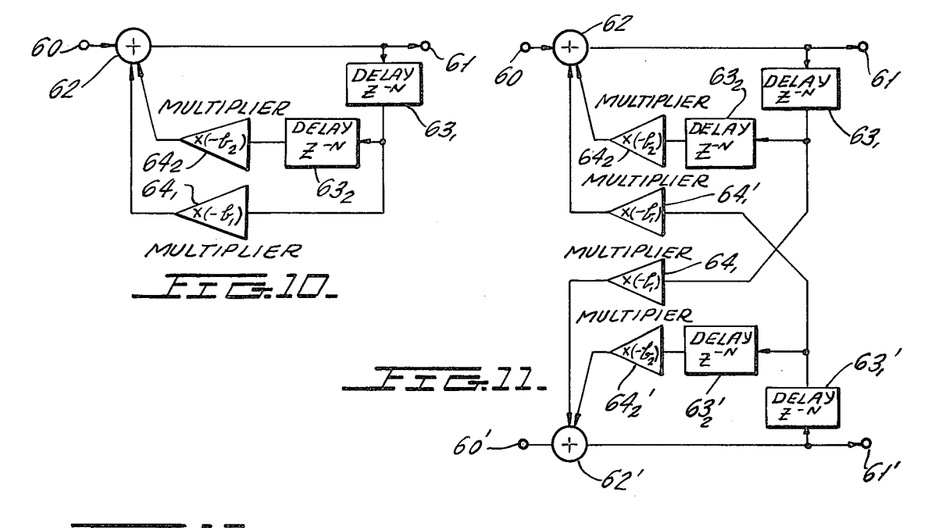
FIG. 10 is a block diagram of a real band-pass filter.
FIG. 11 is a block diagram of a complex band-pass filter which provides a recursive section of slow complex band-pass filters used in a communication system according to this invention.
Figure 12:
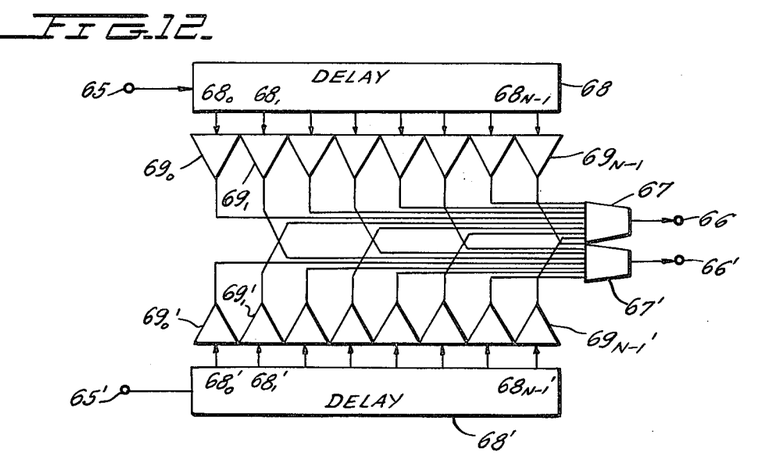
FIG. 12 is a block diagram of a complex band-pass filter which provides a non-recursive section of the slow complex band-pass filters.

Turning now to FIGS. 10 through 12, description will be made of slow complex band-pass filters 42$k$ and 48$k$ together with the filter breakdown process adapted to the present case. Let the result of design of a fast real filter satisfying the in-band and cross-talk rejection ratio specifications be a transfer function G(Z) which has M poles and M zeroes and is accordingly given by:

$$G(Z) = \prod_{m=1}^{M} [(1 - a_m Z^{-1}) E_m / (1 - b_m Z^{-1})],$$

where $a_m$, $b_m$, and $E_m$ represent constants determined by the specifications. By the use of an identity:

$$(1 - x)^{-1} = (1 + x + x^2 + \ldots + x^{N-1})(1 - x^N)^{-1},$$

where N represents the number of slow real band-pass filters into which the fast real $M^{th}$-order filter is broken down, the transfer function is rewritten into:

$$G(Z) = [1 + \sum_{m=1}^{M} c_{mN}(Z^{-N})^m] / \prod_{m=1}^{M} (1 - b_m^N Z^{-N}) \quad (8)$$
$$+ \sum_{i=1}^{N-1} Z^{-i} [\sum_{m=0}^{M-1} c_{mN+i}(Z^{-N})^m] / \prod_{m=1}^{M} (1 - b_m^N Z^{-N}),$$

where $c_{mN}$ represents constants given by rational formulae of the above-mentioned constants $a_m$, $b_m$, and $E_m$ and the number N. From comparison of Equation (8) with Equation (2), the transfer functions $G_i(Z^N)$ of the slow real band-pass filters are:

$$G_0(Z^N) = [1 + \sum_{m=1}^{M} c_{mN}(Z^{-N})^m] / \prod_{m=1}^{M} (1 - b_m^N Z^{-N}) \quad (9)$$

and for $1 \leq i \leq N-1$:

$$G_i(Z^N) = [\sum_{m=0}^{M-1} c_{mN+i}(Z^{-N})^m] / \prod_{m=1}^{M} (1 - b_m^N Z^{-N}), \quad (10)$$

wherein it is generally possible to rewrite each of the denominators into a product of one or more quadrature formulae (a linear formula being a specific case of a quadrature formula). The transfer functions $G_i(-jZ^N)$ of the slow complex band-pass filters 42$k$ and 48$k$ are obtained by substituting $-jZ^N$ for $Z^N$ in the right-hand sides of Equations (9) and (10).

Referring more specifically to FIG. 10, a real filter comprises an input terminal 60, an output terminal 61, an adder 62 connected to the input terminal 60 and adapted to supply a filter output signal to the output terminal 61, a first delay circuit 63$_1$ for delaying the filter output signal by one slow sampling period T, a second delay circuit 63$_2$ for delaying the delayed filter output signal further by one slow sampling period, a first multiplier 64$_1$ for multiplying the one-sample delayed signal by a factor $-b_1$ to supply the multiplied signal to the adder 62, and a second multiplier 64$_2$ for multiplying the two-sample delayed signal by another factor $-b_2$ to supply the product signal to the adder 62. The filter has a transfer function $F(Z^N)$ given by:

$$F(Z^N) = (1 + b_1 Z^{-N} + b_2 Z^{-2N})^{-1},$$

being that portion of the transfer functions given by Equations (9) and (10) in which the denominator is a quadrature formula and the numerator is equal to unity.

Referring to FIG. 11 in particular, a complex filter comprises similar elements designated by like reference numerals without primes and with primes as in FIG. 10. The elements indicated by reference numerals with primes are for the imaginary part of the filter input signal. It is to be noted here that the first multipliers 64$_1$ and 64$_1$' supply the product signals to the adders 62' and 62, respectively, and that the second multipliers 64$_2$ and 64$_2$' are for multiplying the two-sample delayed imaginary and real filter output signals by a common factor $b_2$ rather than by a factor $-b_2$ as was the case with the corresponding element described with reference to FIG. 10. The filter has a transfer function $F(-jZ^N)$, namely:

$$F(-jZ^N) = (1 + jb_1 Z^{-N} - b_2 Z^{-2N})^{-1}.$$

It is now understood that the illustrated filter realizes at least partly the denominator of the transfer functions $G_O(-jZ^N)$ and $G_i(-jZ^N)$ for $1 \leq i \leq N-1$, namely, the filter provides at least partly the recursive section of the slow complex band-pass filters $42k$ and $48k$.

Referring now to FIG. 12 more in detail, a non-recursive section of the slow complex band-pass filters $42k$ and $48k$, namely, the numerator of the transfer functions $G_O(-jZ^N)$ and $G_i(-jZ^N)$ for $1 \leq i \leq N-1$, is realized in the so-called direct form by the depicted circuit which comprises a pair of input terminals 65 and 65' for the real and imaginary parts of a complex filter input signal, a pair of output terminals 66 and 66' for the real and imaginary parts of a complex filter output signal, a pair of M-input adders 67 and 67' having output terminals connected to the respective output terminals 66 and 66', and a pair of delay circuits 68 and 68' connected to the respective input terminals 65 and 65'. Each of the delay circuits 68 and 68' has a plurality of taps $68m$ and $68m'$, respectively. The real and imaginary filter input signals are successively delayed by $m$ slow sampling period or periods $mT$ and produced at the taps $68m$ and $68m'$, respectively. A plurality of multipliers $69m$ for multiplying the successively delayed real signals for the factors $c_{mN+i}$ of Equations (9) and (10) are connected to the respective taps $68m$, where $C_{ON}$ is equal to unity. A plurality of similar multipliers $69m'$ are for the successively delayed imaginary signals. Product signals derived from even-numbered ones of the multipliers $69m$ and $69m'$ are supplied to the adder 67, while those from odd-numbered ones, to the other adder 67'.

From FIGS. 10 through 12, it will be understood that the slow complex band-pass filters $42k$ and $48k$ are realized by cascade connections of the circuits illustrated with reference to FIGS. 11 and 12. When only one of the real and imaginary parts of the filter input or output signal is necessary, it is possible to dispense with circuit elements for the unnecessary one of the real and imaginary parts to thereby simplify the circuitry. Furthermore, it is possible to expand that section of the filter $42k$ and $48k$ into filters of the direct form which is for the denominators of the right-hand sides of Equations (9) and (10) and to realize, by expanding the denominators and numerators in Equations (9) and (10) into polynomials of Z, those sections of the filters $42k$ and $48k$ in the so-called canonical form which are related to the denominators and numerators. With a filter of the canonical form, the number of the delay circuits is reduced to a half. It is also possible to factorize the numerator into quadrature (linear inclusive) formulae and to realize each of the slow complex band-pass filters $42k$ and $48k$ by a cascade connection of biquad filters.

Figure 13:
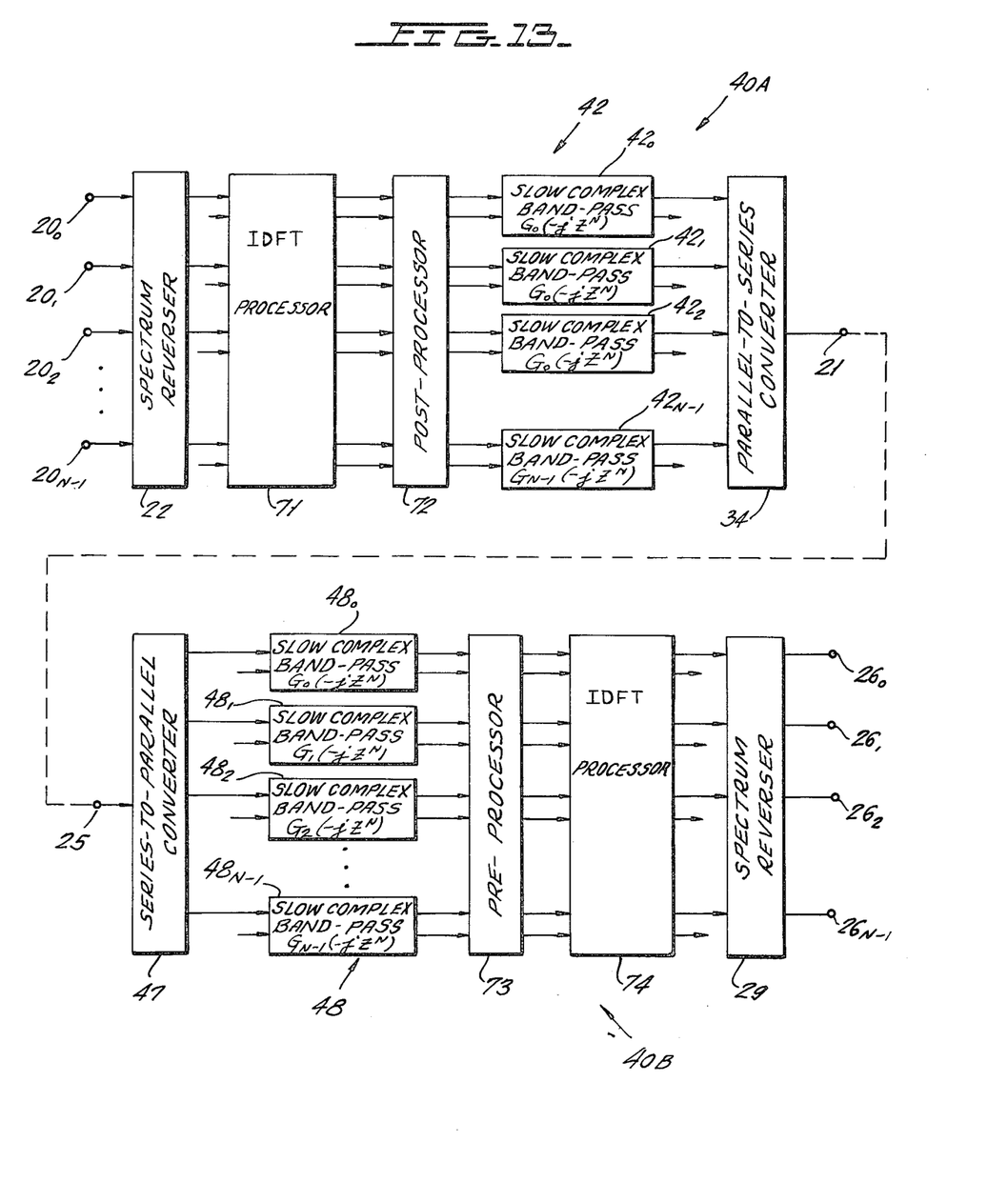
FIG. 13 is a block diagram of an SSB-FDM communication system according to a second embodiment of this invention.

Turning now to FIG. 13, a digital SSB-FDM communication system according to a second embodiment of this invention comprises similar parts designated by like reference numerals as in FIG. 7. Instead of the IODFT processor 41 described with reference to FIG. 7, the modulator 40A comprises an IDFT processor 71 and a post-processor 72 which will shortly be described. Likewise, the demodulator 40B comprises a pre-processor 73 and an IDFT processor 74. In this connection, it is to be noted that Equations (6) and (7) may be rewritten as:

$$A_i(Z^N) = \exp(j2\pi i/[4N]) \sum_{k=0}^{N-1} X_k(Z^N)\exp(j2\pi ki/N) \quad (6')$$

and $$X_k(Z^N) = \sum_{i=0}^{N-1} C_i(Z^N)\exp(j2\pi ki/N), \quad (7')$$

where:

$$C_i(Z^N) = [B_i(Z^N) - jB_{N-i}^*(Z^N)]\exp(j2\pi i/[4N])/2. \quad (11)$$

In other words, IODFT is carried out by the conventional IDFT processing accompanying multiplication by phase offset factors $\exp(j2\pi i/[4N])$ which are independent of $k$ but dependent on $i$. The IDFT processor 71 or 74 is for carrying out the known IDFT processing.

Figure 14:
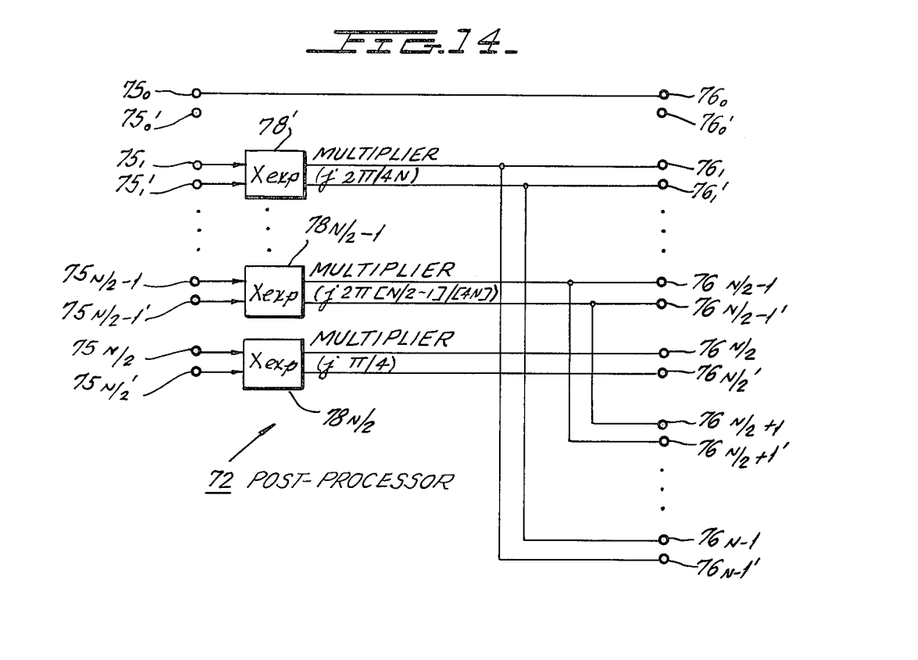
FIG. 14 is a block diagram of a post-processor used in a communication system according to the second embodiment.

Referring to FIG. 14, the post-processor 72 is for carrying out multiplication by the phase offset factors $\exp(j2\pi i/[4N])$ and therefore comprises, in principle, multipliers, N in number. The depicted post-processor 72 has a plurality of input terminal pairs $75_0$, $75_0'$, $75_1$, $75_1'$, ..., $75_{N/2-1}$, $75_{N/2-1}'$, $75_{N/2}$, and $75_{N/2}'$, $N/2-1$ pairs in number, and a plurality of output terminal pairs $76_0$, $76_0'$, $76_1$, $76_1'$, ..., $76_{N/2-1}$, $76_{N/2-1}'$, $76_{N/2}$, $76_{N/2}'$, $76_{N/2+1}$, $76_{N/2+1}'$, ..., $76_{N-1}$, and $76_{N-1}'$, N pairs in number. The terminals numbered without primes and with primes are for the real and imaginary parts, respectively, of input and output signals. Inasmuch as the baseband sample sequences $X_k(Z^N)$ are real signals, Equation:

$$A_{N-i}(Z^N) = jA_i^*(Z^N)$$

follows from Equation (6'), where $A_i^*(Z^N)$ represents conjugate complex quantities of the input-point complex sample sequences $A_i(Z^N)$. It is therefore possible, when the input-point complex sample sequences numbered from 0 to $N/2-1$ are known, to derive other sequences numbered from $N/2$ to $N-1$. Use is, however, made in the illustrated example of both signals $A_0(Z^N)$ and $A_{N/2}(Z^N)$. The zeroth real input terminal $75_0$ is directly connected to the zeroth real output terminal $76_0$. The signals for the zeroth imaginary input and output terminals $75_0'$ and $76_0'$ and for the N/2-th imaginary input terminal $75_{N/2}'$ are not used. The post processor 72 further comprises complex multipliers $78_1$, ..., $78_{N/2-1}$, and $78_{N/2}$ for multiplying the first through N/2-th channel signals by the phase offset factors $\exp(j2\pi/[4N])$, ..., $\exp(j2\pi[N/2-1]/[4N])$, and $\exp(j2\pi/4)$, respectively. It is now understood that the number of the mulitpliers for the phase offset factors is reduced to N/2 in the depicted example.

Figure 15:
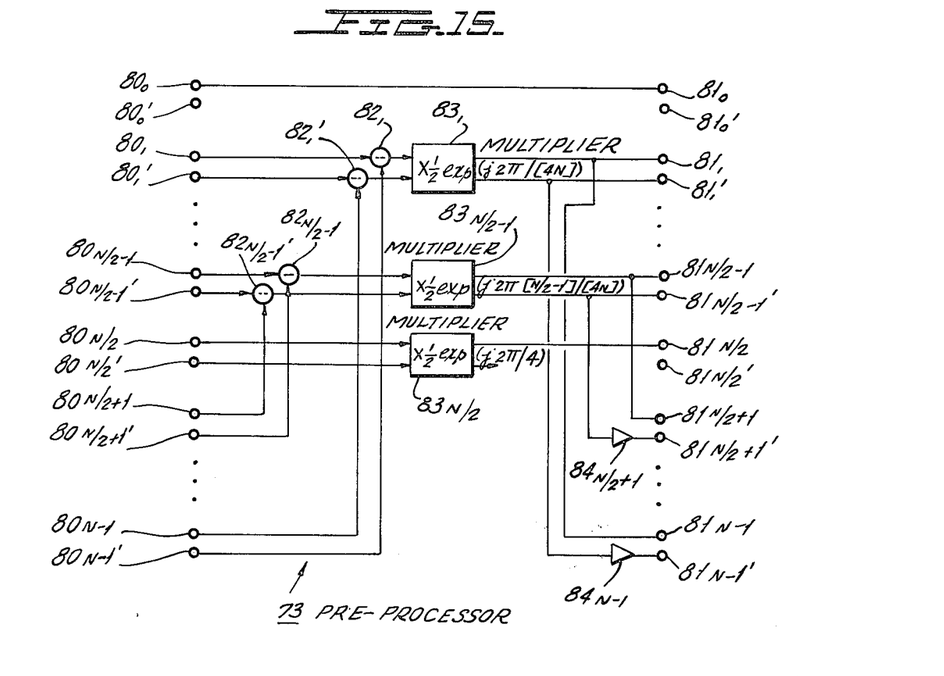
FIG. 15 is a block diagram of a pre-processor used in a communication system according to the second embodiment.

Referring to FIG. 15, the pre-processor 73 is for calculating Equation (11) and has a plurality of real and imaginary input terminals $80_0$, $80_0'$, $80_1$, $80_1'$, ..., $80_{N/2-1}$, $80_{N/2-1}'$, $80_{N/2}$, $80_{N/2}'$, $80_{N/2+1}$, $80_{N/2+1}'$, ..., $80_{N-1}$, $80_{N-1}'$ and a plurality of real and imaginary output terminals $81_0$, $81_0'$, $81_1$, $81_1'$, ..., $81_{N/2-1}$, $81_{N/2-1}'$, $81_{N/2}$, $81_{N/2}'$, $81_{N/2+1}$, $81_{N/2+1}'$, ..., $81_{N-1}$, and $81_{N-1}'$. The zeroth real input terminal $80_0$ is connected directly to the zeroth real output terminal $81_0$. No use is made of the signals for the zeroth imaginary input and output terminals $80_0'$ and $81_0'$ for the N/2-th imaginary output terminal $81_{N/2}'$. Inasmuch as:

cation system and reduces, in turn, accumulation during signal processing of errors and the time required for carrying out the conversion between the baseband channel signals and the SSB-FDM signal.

In order to illustrate the reduction achieved by this invention in the rate of multiplication, let 60-channel baseband channel signals, each having a bandwidth between 0.3 and 3.4 kHz, be converted to an SSB-FDM signal having a bandwidth between 8 and 248 kHz. Use may be made of four additional dummy baseband channels. Furthermore, let the first sampling frequency $f_s$ be 8 kHz. For a modulator 40A depicted in FIG. 13 and comprising a 64-point IDFT processor 71 for real input signals of radix-two, the rate of multiplication has been calculated in accordance with a method described by Glenn D. Bergland under the title of "A Fast Fourier Transform Algorithm for Real-Valued Series" in "Communications of the ACM," Vol. 11, No. 10 (October 1968), pp. 703–710. With eight (8) selected as the order M, each of the slow complex band-pass filters 42$k$ is composed of recursive sections described with reference to FIG. 11 and a non-recursive section, with elements related to the imaginary filter output signal omitted, illustrated in conjunction with FIG. 12. Under the circumstances, the frequencies of real multiplication per period of the 8 kHz signal in the IDFT processor 71, post-processor 72, and filters 42$k$ are 166, 128, and 1,536, respectively. The total rate per second is 14,640 $\times 10^6$, which value is about 75% of the rate of real multiplication of 19,392 $\times 10^6$ required per second for a modulator disclosed in the often-cited Bellanger et al article.

It is now reminded that the preferred embodiments described with reference to FIGS. 7, 13, and 17 have been derived from the fundamental filter bank comprising the fast complex band-pass digital filters 23$k$ or 27$k$ whose transfer functions $H_k(Z)$ may be derived from a fast real low-pass filter of FIG. 4 or 5 having a transfer function G(Z) by frequency shifts of $(4k + 1)f_s/4$. It is possible to use another set of frequency shifts, such as $(4k + 3)f_s/4$, $[4(N - k) - 1]f_s/4$, and $[4(N - k) - 3]f_s/4$. In this event, the transfer functions $G_k(-jZ^N)$ of the slow complex band-pass filters 42 and 48 may become $G_k(jZ^N)$, IDFT may become DFT (discrete Fourier transform), and the phase offset factors may become $\exp(-j2\pi i/]4N])$ or $\exp(\pm j6\pi i/[4N])$.

What is claimed is:

1. A single side-band frequency division multiplexed communication system for input sample sequences of real samples derived with a first sampling frequency $f_s$ from baseband channel signals, respectively, of a plurality of baseband channels, N in number, said baseband channels including a predetermined number of dummy baseband channels, said predetermined number being less than N, each of said baseband signals having a bandwidth equal to or less than $f_s/2$, said communication system comprising:
   first means for subjecting said sample sequences of real samples to offset discrete Fourier transformation to convert said sample sequences into a first set of complex sample sequences, N in number;
   second means for digitally band-pass filtering said first set of complex sample sequences into a first set of real single side-band frequency division multiplexed sequence of samples corresponding to said real samples of said input same sequences and sampled at a second sampling frequency equal to N$f_s$;
   third means for converting said first set of real single side-band frequency division multiplexed sequence into a plurality of constituent sample sequences of real samples, N in number;
   fourth means for converting said real samples of said plurality of constituent sample sequences into a second set of complex sample sequences, N in number, by digitally band-pass filtering said real samples of said constituent sample sequences, said second set of complex sample sequences corresponding to said samples of said single side-band frequency division multiplexed sequence and being sampled at said first sampling frequency; and
   fifth means for subjecting the second set of complex sample sequences to offset discrete Fourier transformation to convert said second set of complex sample sequences into reproductions of said input sample sequences of real samples.

2. A modulator for modulating input sample sequences of real samples derived with a first sampling frequency $f_s$ from baseband channel signals, respectively, of a plurality of baseband channels, N in number, into a real single side-band frequency division multiplexed sequence of samples corresponding to said real samples and sampled at a second sampling frequency equal to N$f_s$, said baseband channels including a predetermined number of dummy baseband channels, said predetermined number being less than N, each of said baseband signals having a bandwidth equal to or less than $f_s/2$, said modulator comprising:
   Fourier transfer means for subjecting said sample sequences of real samples to offset discrete Fourier transformation to convert said sample sequences of real samples into a first set complex sample sequences, N in number;
   complex band-pass digital filter means for digitally filtering said first set of complex sample sequences into filter output signals, said digital filter means performing a filter breakdown process and comprising a complex filter operable at said second sampling frequency;
   digital processing means for digitally converting said filter output signals into a time division multiplexed signal having said second sampling frequency and having real components only; and
   means for converting said real components of said time division multiplexed signal into said single side-band frequency division multiplexed sequence of samples.

3. A demodulator for demodulating a single side-band frequency division multiplexed sequence of real samples into a plurality of output sample sequences of real samples derived with a first sampling frequency $f_s$ from baseband channel signals, respectively, of a plurality of baseband channels, N in number, the real samples of said single side-band frequency division multiplexed sequence corresponding to the real samples of said output sample sequences and being sampled at a second sampling frequency equal to N$f_s$, said baseband channels including a predetermined number of dummy baseband channels, said predetermined number being less than N, each of said baseband signals having a bandwidth equal to or less than $f_s/2$, said demodulator comprising:
   complex band-pass digital filter means for converting said real samples of said frequency division multiplexed sequence into a set of complex sample sequences, N in number, by digitally band-pass filtering said real samples of said frequency division $$C_{N-i}(Z^N) = C_i^*(Z^N),$$

the subtraction $B_i(Z^N) - jB_{N-i}^*(Z^N)$ in Equation (11) is carried out by subtractors $82_1, 82_1', \ldots, 82_{N/2-1}$, and $82_{N/2-1}'$, N-2 in number, connected as shown to produce difference signals representative of the respective results of the above-mentioned subtraction. The difference signals and the signals supplied to the N/2-th input terminals $80_{N/2}$ and $80_{N/2}'$ are multiplied at multipliers $83_1, \ldots, 83_{N/2-1}$, and $83_{N/2}$ by the phase offset factors $\exp(j2\pi/[4N])/2, \ldots, \exp(j2\pi[N/2-1]/[4N])/2$, and $\exp(j\pi/4)/2$, respectively. Imaginary parts of the signals produced from the respective multipliers $83k$ are multiplied at minus-one multipliers $84_{N/2+1}, \ldots,$ and $84_{N-1}$, described with reference to FIG. 9, and then delivered to the imaginary output terminals $81_{N/2+1}', \ldots,$ and $81_{N-1}'$, respectively.

Figure 16:
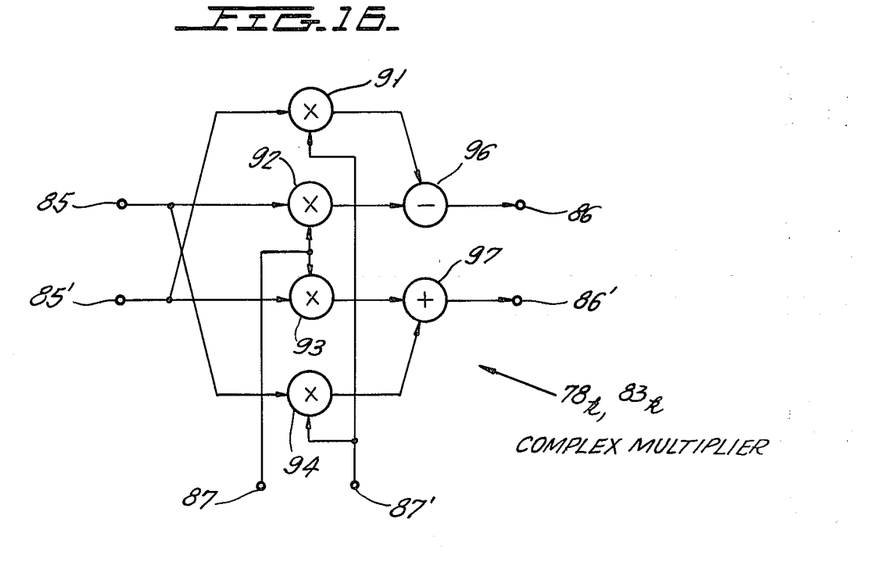
FIG. 16 is a block diagram of a complex multiplier used in the post-processor and pre-processor.

Referring to FIG. 16, each of the complex multipliers $78k$ and $83k$ comprises a pair of real and imaginary signal input terminals 85 and 85', real and imaginary output terminals 86 and 86', and real and imaginary factor input terminals 87 and 87' for $\text{Re}[\exp(j2\pi i/[4N])]$ and $\text{Im}[\exp(j2\pi i/[4N])]$ or halves thereof, respectively. The multiplier $78k$ or $83k$ further comprises real multipliers 91, 92, 93, and 94, a real subtractor 96, and a real adder 97 connected as shown. The real multipliers 91 through 94 may be those described with reference to FIGS. 10 and 11 of an article contributed under the title of "An Approach to the Implementation of Digital Filters" by Leland B. Jackson et al to "IEEE Transactions on Audio and Electroacoustics," Vol. AU-16, No. 3 (September 1968), pp. 413–421.

Figure 17:
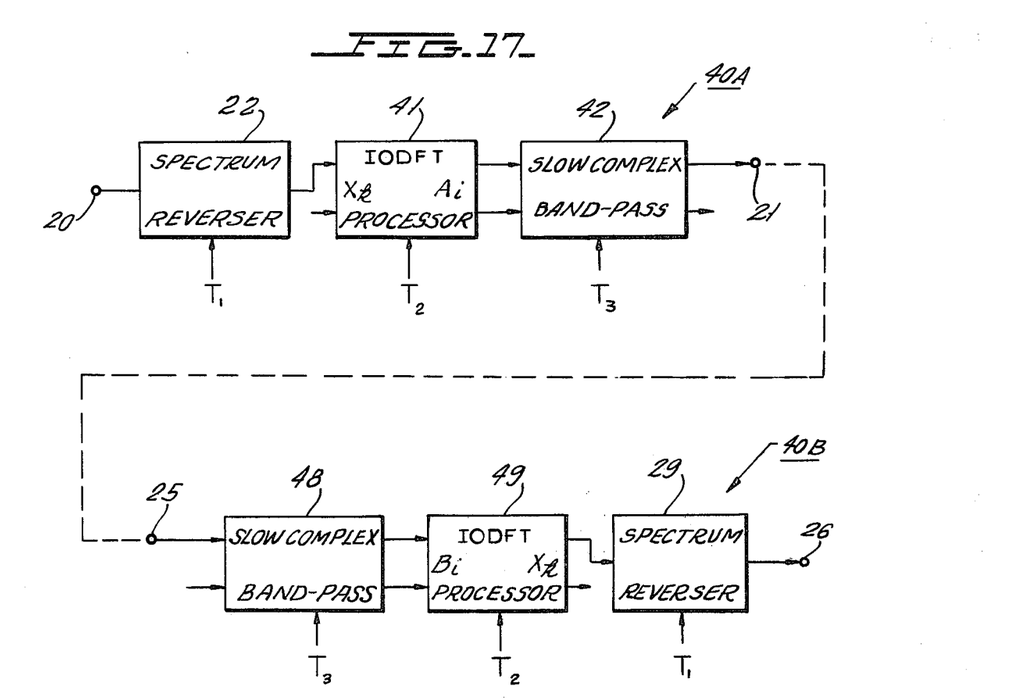
FIG. 17 is a block diagram of an SSB-FDM communication system according to a third embodiment of this invention.
Figure 18:
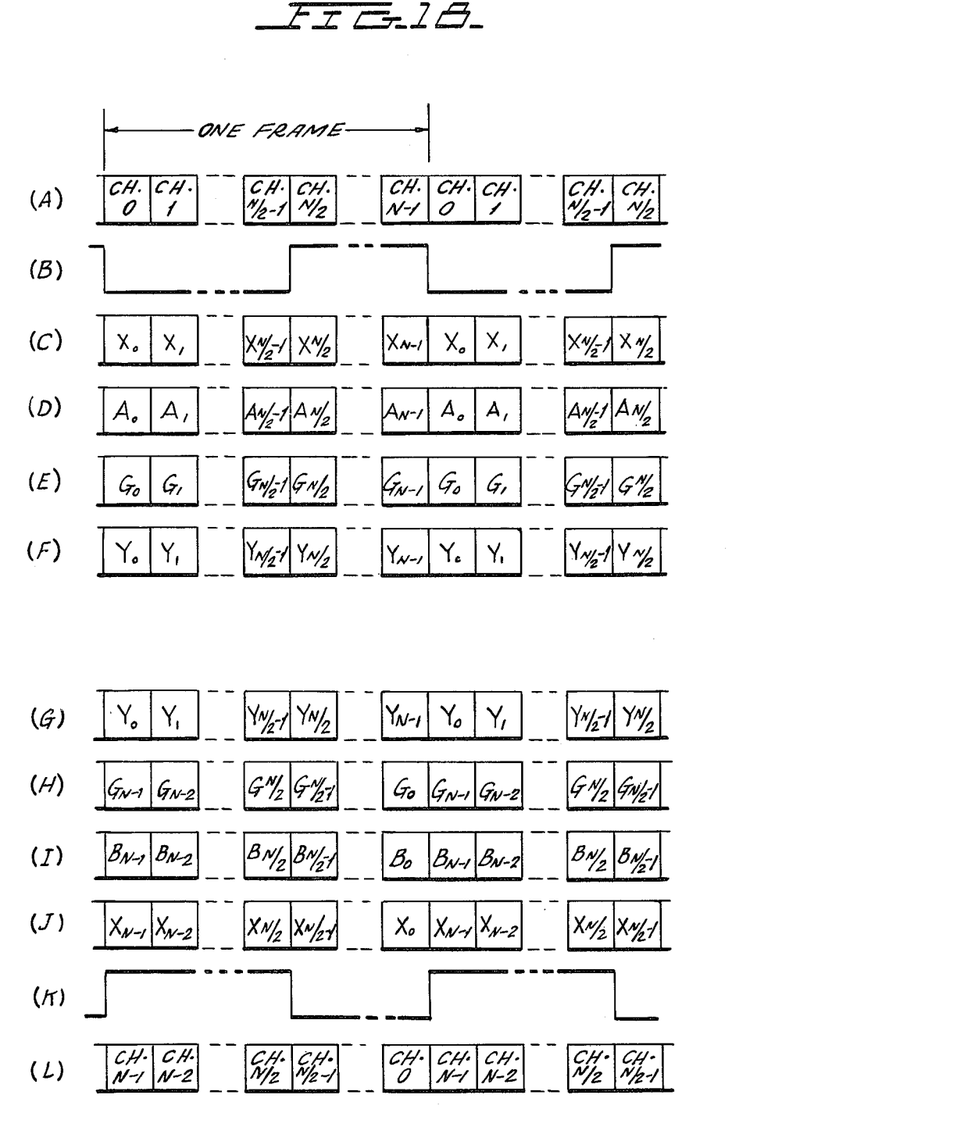
FIG. 18 is a time chart of several signals used in a communication system according to the third embodiment.

Referring finally to FIGS. 17 and 18, a digital SSB-FDM communication system according to a third embodiment of this invention is for serially processing the sample sequences by the use of circuit elements, each being one or less than the number of the baseband channels in number for all baseband channels, rather than processing the sequences in parallel as in the communication systems according to the first and second embodiments. Similar parts are designated by like reference numerals. In the example being illustrated, use is made of only one each of the modulator input terminal 20, output terminal 21, spectrum reverser 22, demodulator input terminal 25, output terminal 26, slow complex band-pass filter 42, and so forth.

In the modulator 40A depicted in FIG. 17, baseband samples for the baseband channels, N in number, are supplied to the single input terminal 20 as a time division multiplexed sequence shown in FIG. 18 at (A) by the use of channel numbers CHk. With a first timing signal $T_1$ supplied to the selector 54 illustrated with reference to FIG. 8 to control the same, the single spectrum reverser 22 is cyclically energized as symbolized in FIG. 18 at (B) to reverse the frequency spectra of the baseband samples for the predetermined baseband channels and to provide a sequence of the above-mentioned input baseband samples $X_k(Z^N)$ in sequence as shown at (C). Responsive to a second timing signal $T_2$ of the slow sampling rate and to a cyclically varying sequence of the phase offset factors $\exp(j2\pi i/[4N])$, the IODFT processor 41 produces a sequence of IODFT'ed output-point complex samples $A_i(Z^N)$ depicted in FIG. 18 at (D). The single slow complex band-pass filter 42 has a variable transfer function which cyclically assumes the value $G_i(-jZ^N)$ as shown in FIG. 18 at (E). More particularly, the factors $b_1$, $b_2$, and $c_{mN}$ are supplied to the filter sections exemplified in FIGS. 11 and 12 as sequences of signals $T_3$ in synchronism with the second timing signal $T_2$. This time division multiplexed use of a single filter is known in the art of digital signal processing, being described, for example, in Chapter 9 of the above-cited book written by L. R. Rabiner and B. Gold or in the above-referenced Jackson et al article with reference to FIGS. 12 and 13 thereof. Responsive to the IODFT'ed sample sequence, the slow complex band-pass filter 42 supplies the single output terminal 21 with a sequence of real-part filter output signals $Y_i(Z)$ depicted in FIG. 18 at (F). The parallel-to-series converter 34 shown in FIGS. 7 and 13 as hardware is unnecessary in the example illustrated in FIG. 17.

In the demodulator 40B also depicted in FIG. 17, the input terminal 25 is supplied with a sequence of those constituent samples $Y_i(Z)$, again shown in FIG. 18 at (G), into which an input SSB-FDM sample sequence is decomposed by the analog-to-digital converter included in the broken-line connection as pointed out hereinabove. As in the modulator 40A, the single slow complex band-pass filter 48 has a transfer function $G_i(-jZ^N)$ varied cyclically in a time division fashion illustrated in FIG. 18 at (H) to produce a sequence of complex filter output signals $B_i(Z^N)$ depicted at (I). The filter output signal sequence is processed by the IODFT processor 49. Only real parts $X_k(Z^N)$, shown in FIG. 18 at (J), of the IODFT'ed signals are supplied sequentially to the single spectrum reverser 29 and processed thereby in a manner exemplified in FIG. 18 at (K) to be supplied to the single output terminal 26 as a sequence of time division multiplexed baseband samples shown at (L). The series-to-parallel converter 47 is unnecessary.

In connection with the example of serially operable SSB-FDM communication systems illustrated with reference to FIGS. 17 and 18, the number of circuit elements may be increased to . . . , N/4, or N/2 in consideration of speeds of operation of the IODFT processors 41 and 49 and the single slow complex band-pass filter 42 or 48. It is immaterial whether or not the number of baseband channels is an integral multiple of 2, 4, . . . Conversely, the real and imaginary parts may be dealt with in a time division manner when the hardware is operable at a sufficiently high speed. The IODFT processor 41 or 49 used in the serially operable SSB-FDM communication systems according to the third embodiment may be changed to a cascade connection of a conventional IDFT processor 71 or 74 and a post-processor 72 or a pre-processor 73 illustrated with reference to FIGS. 13 through 15. An FFT processor suitable to time division multiplexed operation of the IODFT processors 41 and 49 is described as a pipeline-type FFT processor in the above-mentioned book written by L. R. Rabiner and B. Gold. For time division multiplexed operation of the post-processor 72 and pre-processor 73, the factor input terminals 87 and 87' described with reference to FIG. 16 should be cyclically supplied with the phase offset factors $\exp(j2\pi i/[4N])$.

While a few preferred embodiments of this invention and several modifications thereof has thus far been described,, it should be understood that two principal steps of IODFT and of slow complex digital band-pass filtering are carried out according to the preferred embodiments without that further step of carrying out conversion between the baseband channel signals and the equivalent complex signals which is indispensable in the system disclosed in the above-cited Bellanger et al article. The reduction in the number of steps facilitates design, manufacture, and maintenance of the communimultiplexed sequence, said set of complex sample sequences corresponding to the samples of said frequency division multiplexed sequence and sampled at said first sampling frequency; and Fourier transfer means for subjecting said complex sample sequences to offset discrete Fourier transformation to convert said complex sample sequences into said output sample sequences of real numbers.

4. The system of claim 1 further including spectrum reverser means for reversing the frequency spectrum of selected ones of said input sample sequences prior to applying said input sample sequences to said first means.

5. The system of claim 1 further including spectrum reverser means for reversing the frequency spectrum of selected ones of said sample sequences developed by said fifth means.

6. The modulator of claim 2 wherein said digital filter means comprises:

- a plurality of slow complex filter means, each of said slow complex filter means for shifting the frequency of a different one of said sample sequences of real samples; and

- means for sequentially coupling each of said frequency shifted sample sequences generated by said slow complex filter means to a common output terminal.

7. The system of claim 2 further including spectrum reverser means for reversing the frequency spectrum of selected ones of said sample sequences of real samples before they are applied to said Fourier transfer means.

8. The system of claim 2 wherein said Fourier transfer means comprises an inverse discrete Fourier transformation (IDFT) processor and a post processor coupled to said processor for offsetting the outputs of said IDFT processor.

9. The system of claim 3 wherein said Fourier transfer comprises a preprocessor and an inverse discrete Fourier transformation (IDFT) means coupled to said preprocessor, said preprocessor comprising multiplier means for coupling offsetting inputs to said IDFT means.

10. The system of claim 1 wherein said first means generates said first set of complex sample sequences from said real samples only.

* * * * *